United States Patent [19]

Lindgren

[11] Patent Number: 4,718,815
[45] Date of Patent: Jan. 12, 1988

[54] DEVICE FOR CARRYING AND ADJUSTING A TOOL

[75] Inventor: Kenneth Lindgren, Borlänge, Sweden

[73] Assignee: AVP Robot AB, Borlänge, Sweden

[21] Appl. No.: 887,806

[22] PCT Filed: Nov. 27, 1985

[86] PCT No.: PCT/SE85/00487
§ 371 Date: Jul. 16, 1986
§ 102(e) Date: Jul. 16, 1986

[87] PCT Pub. No.: WO86/03157
PCT Pub. Date: Jun. 5, 1986

[30] Foreign Application Priority Data
Nov. 28, 1984 [SE] Sweden .............................. 8405998

[51] Int. Cl.$^4$ ............................................... B25J 9/06
[52] U.S. Cl. ..................................... 414/729; 901/15; 901/22; 901/27
[58] Field of Search ............... 901/14, 15, 18, 22, 901/27; 414/735, 729, 730, 744 A, 744 R

[56] References Cited

U.S. PATENT DOCUMENTS

| | | | |
|---|---|---|---|
| 3,543,910 | 12/1970 | Devol et al. | 414/735 X |
| 3,840,128 | 10/1974 | Swoboda, Jr. et al. | 901/18 X |
| 3,954,188 | 5/1976 | Boyle | 901/18 X |
| 3,984,009 | 10/1976 | Holroyd | 901/18 X |
| 4,298,308 | 11/1981 | Richter | 414/730 |
| 4,348,731 | 9/1982 | Kogawa | 901/15 X |
| 4,367,998 | 1/1983 | Causer . | |
| 4,378,959 | 4/1983 | Susnjara | 901/15 X |
| 4,396,344 | 8/1983 | Sugimoto et al. | 901/15 X |

FOREIGN PATENT DOCUMENTS

| | | | |
|---|---|---|---|
| 3028041 | 2/1982 | Fed. Rep. of Germany | 901/15 |
| 2560546 | 9/1985 | France | 901/15 |
| WO84/02301 | 6/1984 | PCT Int'l Appl. . | |

*Primary Examiner*—Robert J. Spar
*Assistant Examiner*—P. McCoy Smith
*Attorney, Agent, or Firm*—Browdy and Neimark

[57] ABSTRACT

A device for carrying and adjusting a tool has a frame and a base member which is rotatably connected to the frame about a first axis with a main arm pivotally connected at one end to the base member and at the other end to a lifting-arm holder with a yoke pivotally connected at its central portion to the main arm at some distance from one end thereof. A piston rod part of a first cylinder assembly is pivotally connected to a projection projecting at an angle from the main arm, and its cylinder part is pivotally connected to one arm of the yoke with a piston rod part of a second cylinder assembly pivotally connected to the base member and its cylinder part pivotally connected to the other arm of the yoke and with a link arm parallel to the main arm pivotally connected at one end to the other arm of the yoke and pivotally connected at its other end to the lifting-arm holder. A lifting arm is rotatably mounted in the lifting-arm holder for rotation about its own axis which axis extends perpendicularly to the parallel axes about which the main arm, the base member, the lifting-arm holder, the yoke, the cylinder assembly, the projection, the yoke arms, the cylinder assembly, and the link arm are pivotally interconnected. A tool holder for the tool is carried by the lifting arm.

5 Claims, 5 Drawing Figures

DEVICE FOR CARRYING AND ADJUSTING A TOOL

The present invention relates to a device for carrying and adjusting a tool.

Hitherto known devices or robots of this type are complicated in use and also offer a relatively limited adjustability and, thus, a rather restricted range of operation. Most devices or robots of this type currently available on the market are driven by electromechanical means and thus have a poor lifting capacity. By replacing the electromechanical drive means of the prior art devices with hydraulic drive or power transmission means, it is possible to provide devices having a considerable lifting capacity. Such hydraulic devices will however have an even more restricted range of operation.

Consequently, there is a great need for a device or robot having a substantial lifting capacity and allowing positioning or adjusting a tool within a wide range of operation. The object of the present invention therefore is to provide a device which meets this demand and is suited for hydraulic power transmission.

According to the invention, this object is achieved by a device for carrying and adjusting a tool, the device being characterized by a frame, a base member rotatably connected to the frame about a first axis, a main arm which at one end is pivotally connected to the base member about a second axis perpendicular to said first axis and which at the other end is pivotally connected to a lifting-arm holder about a third axis parallel to said second axis, a yoke which at its central portion is pivotally connected to said main arm at some distance from said one end of the main arm about a fourth axis parallel to said second axis, a first cylinder assembly having a cylinder part and a piston rod part movable relative to the cylinder part, one of said parts being pivotally connected to a projection protruding at an angle from said main arm, about a fifth axis parallel to said second axis, and the other of said parts being pivotally connected to one arm of said yoke about a sixth axis parallel to said second axis, a second cylinder assembly having a cylinder part and a piston rod part movable relative to the cylinder part, one of said parts being pivotally connected to said base member about a seventh axis parallel to said second axis, and the other of said parts being pivotally connected to the other arm of said yoke about an eighth axis parallel to said second axis, a link arm parallel to the main arm and pivotally connected at one end to said other arm of said yoke about a ninth axis parallel to said second axis, and pivotally connected at its other end to said lifting-arm holder about a tenth axis parallel to said second axis, a lifting arm which is rotatably mounted in said lifting-arm holder for rotation about its own axis extending perpendicularly to said third and said tenth axis, and a tool holder carried by said lifting arm for holding the tool.

The lifting arm is preferably rotatably mounted in the lifting-arm holder at one end and preferably carries the tool holder at the other end.

In a preferred embodiment, the tool holder is pivotally connected to the lifting arm about an axis perpendicular to the axis of the lifting arm.

Said eighth axis and said ninth axis are preferably one and the same axis.

Preferably, the length of the link arm is telescopically adjustable by means of a cylinder assembly.

The invention will now be described in more detail with reference to the accompanying drawings, in which.

Figure 1:
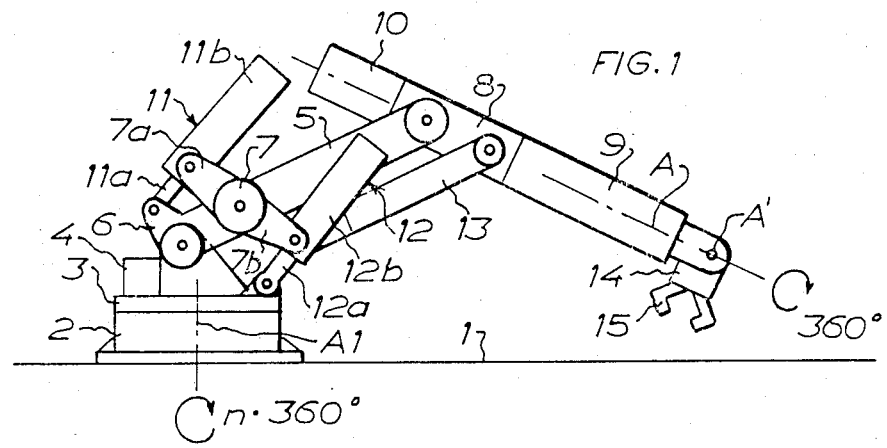
FIG. 1 is a schematic side view illustrating a device according to the present invention in an extended adjusting position in which a tool carried by the device is positioned adjacent a floor.
Figure 2:
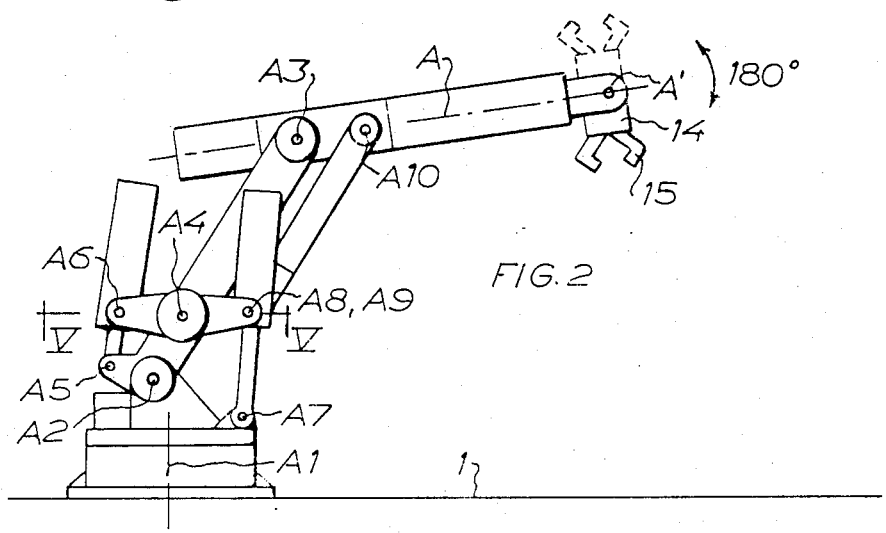
FIG. 2 is a schematic side view illustrating the device of FIG. 1 in an extended adjusting position in which the tool is in a raised position.
Figure 3:
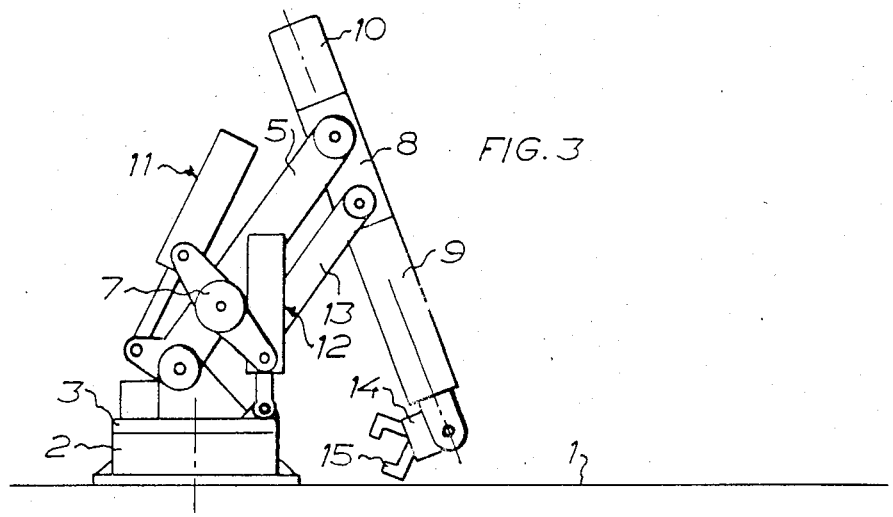
FIG. 3 is a schematic side view illustrating the device of FIG. 1 in a retracted adjusting position in which the tool is positioned near the floor adjacent the frame of the device.

The device illustrated in the drawings has a frame 2 secured to a floor 1. The frame 2 carries a base member 3 which is rotatable by means of a motor 4 at least one revolution about a first vertical axis A1. A main arm 5 is pivotally connected at its lower end to the base member 3 about a horizontal second axis A2. At its lower end, the main arm 5 has a projection 6 protruding at an angle from the arm, and carries a yoke 7 at some distance from said lower end. At its upper end, the main arm 5 is pivotally connected to a holder 8 carrying a lifting arm 9 about a third axis A3 parallel to the second axis A2. At one end, the lifting arm 9 is so mounted in the holder 8 that it is rotatable by means of a motor 10 at least one revolution about its own axis A which is perpendicular to the third axis A3. The yoke 7 makes an angle with the main arm 5 and is pivotally connected to the main arm 5 about a fourth axis A4 parallel to the second axis A2.

The piston rod 11a of a hydraulic cylinder assembly 11 is pivotally connected at its lower free end to the projection 6 of the main arm 5 about a fifth axis A5 parallel to the second axis A2. At its lower portion, the cylinder 11b of the hydraulic cylinder assembly 11 is pivotally connected to one arm 7a of the yoke 7 about a sixth axis A6 parallel to the second axis A2. The piston rod 12a of a hydraulic cylinder assembly 12 is pivotally connected at its lower free end to the base member 3 about a seventh axis A7 parallel to the second axis A2. The cylinder 12b of the hydraulic cylinder assembly 12 is pivotally connected at its lower portion to the other arm 7b of the yoke 7 about an eighth axis A8 parallel to the second axis A2.

A link arm 13 in a plane parallel to the plane containing the main arm 5 is pivotally connected at its lower end to the other arm 7b of the yoke 7 about a ninth axis A9 parallel to the second axis A2, and pivotally connected at its upper end to the lifting-arm holder 8 about a tenth axis A10 parallel to the second axis A2. In the illustrated embodiment, the axis A8 and the axis A9 are one and the same axis.

At its free end, the lifting arm 9 carries a tool holder 14 for a tool 15. The tool holder 14 is pivotally connected to the lifting arm about an axis A' perpendicular to the axis A of the lifting arm 9. The tool holder 14 thus is pivotable back and forth through about 180° by means of cylinder assemblies and chains (not shown) disposed inside the lifting arm 9.

Figure 4:
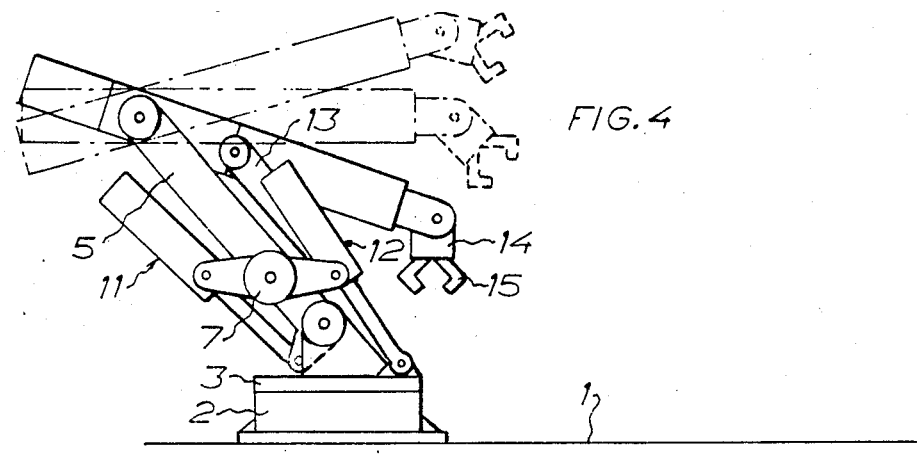
FIG. 4 is a schematic side view illustrating the device of FIG. 1 in a retracted adjusting position in which the tool is slightly raised from the floor.
Figure 5:
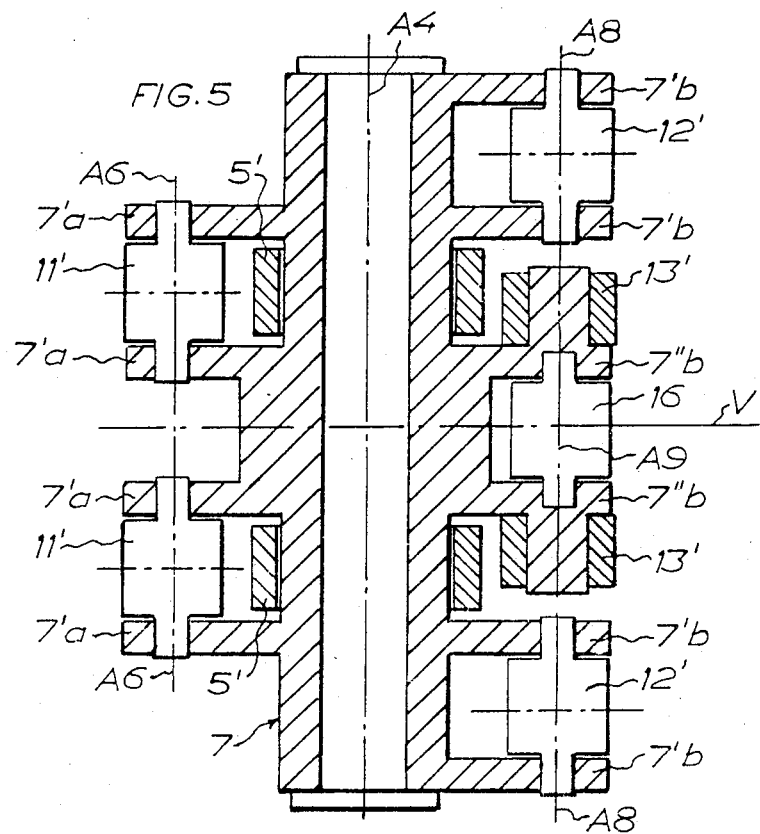
FIG. 5 is a sectional view taken along the line V—V in FIG. 2.

As appears from FIG. 5, the device illustrated in the drawings is symmetric with respect to the vertical plane V containing the axis A of the lifting arm 9. Thus, the main arm 5, the cylinder assembly 11, the cylinder assembly 12 and the link arm 13 of the device consist of two main arms 5', cylinder assemblies 11', cylinder assemblies 12' and link arms 13', respectively, disposed on either side of the vertical plane V, i.e. on either side of the lifting arm 9. The yoke 7 is designed as an integral piece but is also symmetric with respect to the vertical plane V. As appears from FIG. 5, the arm 7a of the yoke 7 consists of two pairs of yoke arms 7'a disposed on either side of the vertical plane V, a cylinder assembly 11' being provided between the arms of each of these pairs of yoke arms. As further appears from FIG. 5, the arm 7b of the yoke 7 consists of two pairs of yoke arms 7'b disposed on either side of the vertical plane V, and one pair of yoke arms 7"b where the yoke arms are disposed on either side of the vertical plane V. A cylinder assembly 12' is provided between the arms 7'b of each of said two pairs of yoke arms. A link arm 13', 13 is pivotally connected to each of the arms 7"b about said ninth axis A9. The link arms 13', 13 are telescopic and their length is adjustable by means of a common hydraulic cylinder assembly 16. The cylinder assembly 16 is provided between the two yoke arms 7"b, its piston rod part being pivotally connected to the yoke arms 7"b about said ninth axis A9 while its cylinder part is connected to a cross-piece interconnecting the upper portions of the two link arms 13. The pivotal movement of the lifting arm 9 resulting from a change of the length of the link arms 13', 13 is illustrated in FIG. 4 by broken lines. This pivotment of the lifting arm 9 can be performed within a pivotal range of about 45°.

In the illustrated embodiment, the main arm 5 is pivotal in relation to the base member 3 through a pivotal range of about 135° and the yoke 7 is pivotal relative to the main arm 5 through a pivotal range of about 110°, this making the lifting arm 9 pivotal relative to the floor 1 through a pivotal range of about 135°. To this should be added the pivotal range of 45° which is achieved by changing the length of the link arm 13.

The coupling means and control means of the hydraulic cylinder assemblies included in the device are well known to anyone skilled in the art and make no part of the invention. These components, therefore, will not be described in greater detail in this context. It may only be mentioned that the device is operated by means of hydraulic servo valves which are controlled by a microprocessor.

As will have been understood from the above, the device now described will permit adjusting a tool within a very wide range of operation, which is made possible especially by the cooperation between the hydraulic cylinder assemblies 11, 12 and 16. Of particular importance is that the yoke 7 is pivotally connected to the main arm 5 at some distance above the lower end of the main arm. This location of the yoke 7 makes the lifting capacity of the device considerable in all adjusting positions.

It is evident that the device of the invention need not necessarily be mounted on a floor but may also be mounted on a wall or in a ceiling.

I claim:

1. A device for carrying and adjusting a tool, characterized by a frame (2), a base member (3) rotatably connected to the frame (2) about a first axis (A1), a main arm (5) which at one end is pivotally connected to the base member (3) about a second axis (A2) perpendicular to said first axis and which at the other end is pivotally connected to a lifting-arm holder (8) about a third axis (A3) parallel to said second axis, a yoke (7), having arms (7a, 7b) which at its central portion is pivotally connected to said main arm (5) at some distance from said one end of the main arm about a fourth axis (A4) parallel to said second axis, a first cylinder assembly (11) having a cylinder part (11b) and a piston rod part (11a) movable relative to the cylinder part, one (11a) of said parts being pivotally connected to a projection (6) protruding at an angle from said main arm, about a fifth axis (A5) parallel to said second axis, and the other (11b) of said parts being pivotally connected to one arm (7a) of said yoke (7) about a sixth axis (A6) parallel to said second axis, a second cylinder assembly (12) having a cylinder part (12b) and a piston rod part (12a) movable relative to the cylinder part, one (12a) of said parts being pivotally connected to said base member (3) about a seventh axis (A7) parallel to said second axis, and the other (12b) of said parts being pivotally connected to the other arm (7b) of said yoke (7) about an eighth axis (A8) parallel to said second axis, a link arm (13) pivotally connected at one end to said other arm (7b) of said yoke (7) about a ninth axis (A9) parallel to said second axis, and pivotally connected at its other end to said lifting-arm holder (8) about a tenth axis (A10) parallel to said second axis, a lifting arm (9) which is rotatably mounted in said lifting-arm holder for rotation about its own axis (A) extending perpendicularly to said third and said tenth axis, and a tool holder (14) carried by said lifting arm (9) for holding the tool (15).

2. Device as claimed in claim 1, characterized in that the lifting arm (9) is rotatably mounted in the lifting-arm holder (8) at one end and carries the tool holder (14) at its other end.

3. Device as claimed in claim 1, characterized in that the tool holder (14) is pivotally connected to the lifting arm about an axis (A') perpendicular to the axis (A) of the lifting arm (9).

4. Device as claimed in claim 1, characterized in that said eighth axis (A8) and said ninth axis (A9) are one and the same axis.

5. Device as claimed in claim 1 characterized in that the length of the link arm (13) is telescopically adjustable by means of a cylinder assembly (16).

* * * * *